(12) United States Patent
Hubbard, Jr. et al.

(10) Patent No.: US 7,415,876 B2
(45) Date of Patent: Aug. 26, 2008

(54) PRESSURE SENSOR SYSTEM

(76) Inventors: James E. Hubbard, Jr., 25 Castle Haven Rd., Hampton, VA (US) 23666; David K. Pullen, 8609 63rd Ave., Berwyn Heights, MD (US) 20740

( * ) Notice: Subject to any disclaimer, the term of this patent is extended or adjusted under 35 U.S.C. 154(b) by 17 days.

(21) Appl. No.: 11/604,994

(22) Filed: Nov. 28, 2006

(65) Prior Publication Data

US 2007/0120006 A1 May 31, 2007

Related U.S. Application Data

(60) Provisional application No. 60/740,437, filed on Nov. 29, 2005.

(51) Int. Cl.
*A63B 53/00* (2006.01)
(52) U.S. Cl. .................................... 73/170.05
(58) Field of Classification Search .............. 73/170.05, 73/861.71, 861.65, 180; 416/223; 415/1
See application file for complete search history.

(56) References Cited

U.S. PATENT DOCUMENTS

| | | | | |
|---|---|---|---|---|
| 4,692,098 A * | 9/1987 | Razinsky et al. | ......... | 416/223 R |
| 6,203,269 B1 * | 3/2001 | Lorber et al. | ............... | 415/115 |
| 6,334,753 B1 * | 1/2002 | Tillman et al. | ................. | 415/1 |
| 6,940,425 B2 * | 9/2005 | Frantz | ........................ | 340/963 |

* cited by examiner

*Primary Examiner*—Jewel Thompson
(74) *Attorney, Agent, or Firm*—Kaufman & Canoles

(57) ABSTRACT

A pressure sensor includes a pressure sensitive element for sensing a distributed fluid pressure and producing a signal in response. The pressure sensitive element is configured to be mountable on an airfoil or a hydrofoil, for example as a thin film piezoelectric element. The sensor finds applications, for example, in measuring lift or drag on the airfoil or hydrofoil.

21 Claims, 3 Drawing Sheets

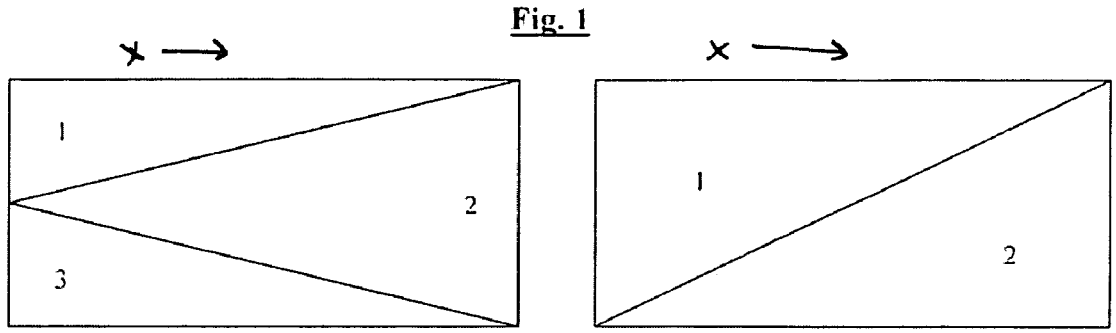
Fig. 1
Fig 1a  Fig 1b
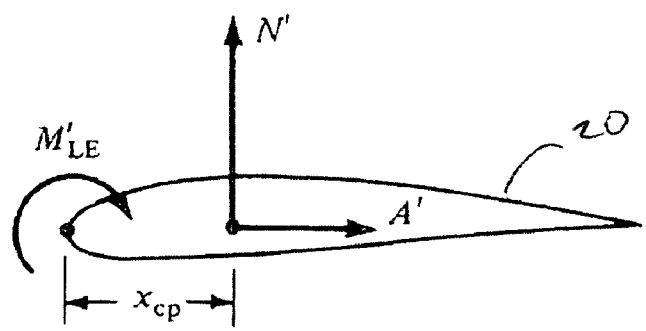
Fig. 2
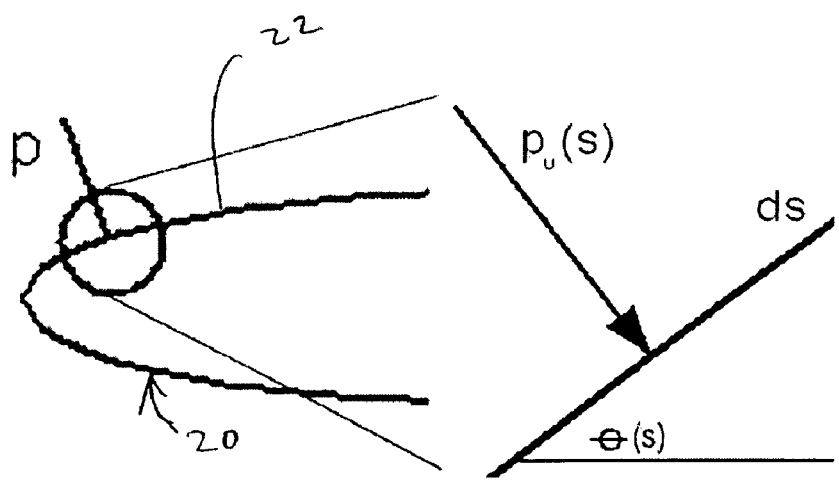
Fig 3a  Fig 3b

Fig 4
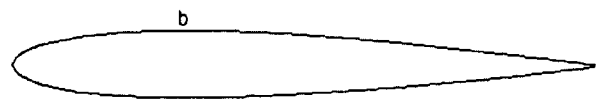
Fig 5a 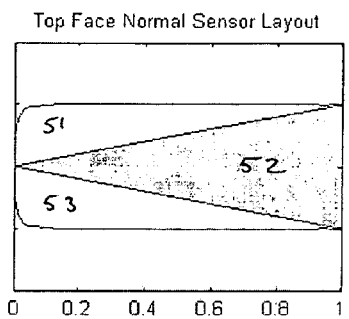 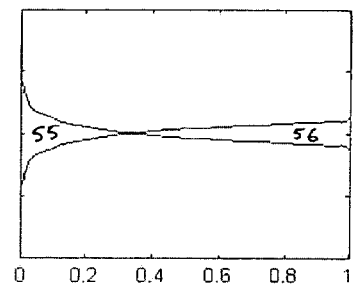 Fig 5b
Fig 5c 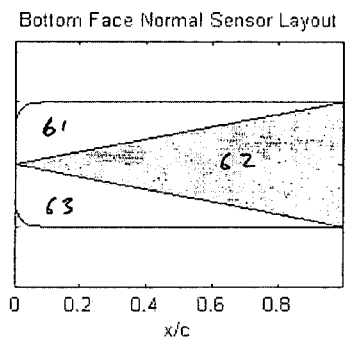 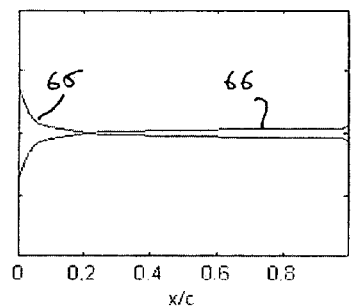 Fig 5d
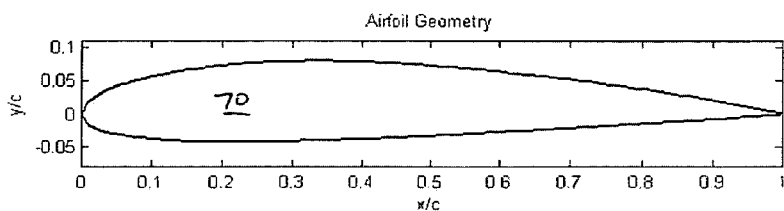
Fig 6

PRESSURE SENSOR SYSTEM

CROSS-REFERENCE TO RELATED APPLICATION

This application claims the benefit of U.S. Provisional Application No. 60/740,437, filed Nov. 29, 2005 for "Conformal Sensors for the Measurement of Aerodynamic and Hydrodynamic Lift and Drag."

STATEMENT REGARDING FEDERALLY SPONSORED RESEARCH OR DEVELOPMENT

The U. S. Government has a paid-up license in this invention and the right in limited circumstances to require the patent owner to license others on reasonable terms as provided for by the terms of Cooperative Agreement No. NCC-1-02043 awarded by the National Aeronautics and Space Administration.

FIELD OF THE INVENTION

This invention relates generally to sensors and more particularly to sensors adaptable for fluid dynamic pressure sensing applications.

BACKGROUND

For airfoils and hydrofoils (collectively herein, "foils") it is useful to enable measurements of fluid dynamic forces including lift and/or drag. In certain applications, the inventors have determined that there may be benefits to making such measurements using sensors having an improved form factor and that have reduced structural impact on structures being monitored.

SUMMARY

In accordance with one embodiment of the present invention, a sensor includes a pressure sensitive element configured and arranged to, when in use, sense a distributed fluid pressure and produce a signal in response, the pressure sensitive element further being configured to be mountable on a foil along a chord-line of the foil. The pressure sensitive element further has a geometry split into chord-wise segments at a portion of a surface of the foil where an angle $\theta$ passes through zero, wherein $\theta$ is an angle of a tangent to the surface measured in a positive counterclockwise direction from the chord-line, such that the signals produced by each of the chord-wise segments may be processed together to obtain an axial component of the sensed distributed pressure.

Another embodiment of the present invention includes a method of measuring a drag on an airfoil or a hydrofoil by measuring a distributed fluid pressure on respective upper and lower front surface portions of the foil, measuring a distributed fluid pressure on respective upper and lower rear surface portions of the foil, and subtracting the measured distributed fluid pressure on the rear surface portions from the measured distributed fluid pressure on the front surface portions to obtain a net axial pressure.

BRIEF DESCRIPTION OF THE DRAWINGS

FIGS. 1a and 1b show schematic diagrams of two layouts for distributed sensors in accordance with embodiments of the present invention;

FIG. 2 shows a cross-section of a surface of a foil and illustrates the concept of center of pressure;

FIG. 3a shows a schematic diagram of a foil and illustrates an intersection of a pressure vector with a segment of a surface of the foil;

FIG. 3b is an expanded view of a portion of FIG. 3a;

FIG. 4 is a schematic diagram of a foil;

FIGS. 5a-d are schematic diagrams of distributed pressure sensors in accordance with embodiments of the present invention;

FIG. 6 is a schematic diagram showing one example of an airfoil geometry with dimensionless units;

DETAILED DESCRIPTION

Figure 7A:
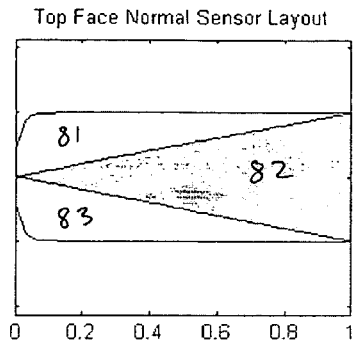
FIGS. 7a-d are schematic diagrams of distributed pressure sensors in accordance with embodiments of the present invention.

One aspect of an embodiment of the present invention includes the use of so-called "smart" materials in, for example, an airfoil for the purpose of measuring pressure information. By proper configuration of the sensors and processing of the measured information, lift and drag information can be determined. The lift and drag information can then be used to make and control adjustments to segmented ailerons on a trailing edge of the wing, thereby improving aerodynamic efficiency and control of the aircraft.

One implementation of this concept makes use of spatially distributed sensors that are constructed and arranged to measure pressures corresponding to lift and drag components of a flow field. These sensors may be formed from materials such as piezoelectric, piezo-resistive and piezo-conductive polymers, composites and crystals, for example. Such materials may be applied non-invasively such that they conform to any desired surface. There is a variety of such materials available at low cost and providing the ability to be formed into high performance sensing media. For example, PZT (lead zirconium titanate) and PVDF (polyvinyldifluoride), are examples of materials suited for use in this application, though this list should by no means be considered to be exhaustive.

By configuring the surface-mounted sensor in an appropriate manner, a spatial aperture weighted sensor can be produced. Accordingly, such sensors can be provided that allow for each sensor's output to be a spatially weighted sum of the pressure field acting over the sensed aperture. As one example, a parameter which may be of interest is center of pressure. For a flat plate, the center of force, $C_f$ can be obtained in a process parallel to determining a centroid of a mass distribution, using Equation 1:

$$C_f = \frac{\int_a^b x \cdot f(x) dx}{\int_a^b f(x) dx} \qquad \text{(Eqn. 1)}$$

For the example of a flat plate, these integrals can be evaluated intrinsically with a distributed sensor by dividing the sheet into two or three sections as shown in FIGS. 1a and 1b. In each case, a region 2 has a linear weighting with x, where x is taken to be from left to right as shown (i.e., along the direction of motion of the foil through the medium). Region 2 has an output that can be related directly to the numerator of Equation 1, while all regions together (1 and 2 or 1, 2, and 3) are related to the denominator of Equation 1.

Using either sensor geometry provides a location of the center of pressure given as percentage of the chord running along the sensor in a direction parallel to the motion of the foil through the medium. For applications on wings, a correction factor to the linear weighting must be taken into account to deal with the curvature of the airfoil 20. Airfoil center of pressure, $x_{cp}$, is defined as $x_{cp} = -M'_{LE}/N'$, where $M'_{LE}$ is the spanwise moment about the leading edge and $N'$ is the spanwise normal force. This relationship is shown in FIG. 2. Using the centroid method, one can acquire the center of pressure without needing to obtain the spanwise moment, but the inventors have determined that it is useful to filter out the axial components of the pressure to obtain the normal force. Without taking this correction factor into account, pressure components of drag will be present in the sensor readings and will corrupt the reading for the center of pressure, a problem that tends to be larger as thicker airfoils are considered.

FIGS. 3a and 3b illustrate a hypothetical pressure p acting on an upper surface 22 of an airfoil 20, where ds is a differentially small section of the airfoil, $p_u(s)$ is the pressure acting on that section, and $\theta(s)$ is the tangent to the surface, measured in a positive counterclockwise direction from the chord-line. The component of normal force due to the pressure acting on the upper surface will then be given by $$N'_U = -\int_0^c p_U(s)\cos(\theta(s))ds.$$

The component of normal force due to pressure acting on the lower surface can be obtained in a similar fashion. The combined equation for spanwise normal force due to pressure is then:

$$N' = \int_0^c (p_L(s) - p_U(s))\cos(\theta(s))ds \quad \text{(Eqn. 2)}$$

The correction factor of $\cos(\theta)$ can be extracted from this equation. Applying this modification yields the following equation for center of pressure acting on distributed sensors applied to both surfaces of an airfoil:

$$C_f = \frac{\int_0^c x(s)/c \cdot \cos(\theta_L(s)) \cdot p_L(s)ds}{\int_0^c \cos(\theta_L(s)) \cdot p_L(s)ds} - \frac{\int_0^c x(s)/c \cdot \cos(\theta_U(s)) \cdot p_U(s)ds}{\int_0^c \cos(\theta_U(s)) \cdot p_U(s)ds} \quad \text{(Eqn. 3)}$$

In Eqn. 3, c is the chord length, x(s) is the distance along the chord at point s, $\theta(s)$ is the tangent to the wing at the point s, and $p_u(s)$ and $p_L(s)$ are the pressures at point s on the top and bottom surfaces, respectively.

In a modified form, such distributed sensors may also be used to provide a simplified calculation of drag. In lieu of the normal force, an axial component is obtained in accordance with Eqn. 4. Note that the negative sign arises because $\theta$ continues to be defined as counterclockwise positive, as above.

$$A' = \int_0^c p_U(s)\sin(\theta(s))ds - \int_0^c p_L(s)\sin(\theta(s))ds \quad \text{(Eqn. 4)}$$

The sin term will yield negative results any time $\theta$ is negative on the top surface or positive on the bottom. This result is in accord with the observation that components of the total pressure that are applied to the foil surface past point b as shown in FIG. 4 should tend to push the airfoil forward due to the angle at which they meet the foil.

As may be apparent, it is not possible to provide a sensor having a negative area in a process strictly parallel to the one used to measure the normal force described above. Instead, at the point (or points, for more complex geometries than that shown in FIG. 2) along the direction x where $\theta$ passes through zero, the sensor is split into chord-wise segments. As a result, the sensor integral for drag is further refined to:

$$A' = \left(\int_0^{b\{U\}} p_U(s)\|\sin(\theta(s))\|ds + \int_0^{b\{L\}} p_L(s)\|\sin(\theta(s))\|ds\right) - \left(\int_{b\{U\}}^c p_U(s)\|\sin(\theta(s))\|ds + \int_{b\{L\}}^c p_L(s)\|\sin(\theta(s))\|ds\right) \quad \text{(Eqn. 5)}$$

wherein b {U} and b {L} are the points where $\theta$ passes through zero on the upper and lower surfaces, respectively.

In use, the device of FIGS. 5a-d could be used to measure both lift and drag on an airfoil 70 such as the one illustrated in cross section in FIG. 6. Though the sensor shown in FIGS. 5a-d is illustrated as having a number of sub-elements 51, 52, 53 and 61, 62, 63, for a lift measurement, the entire area of the sensor can be treated as a single element. While, as described above, the sub-elements allow for calculations of additional parameters such as center of pressure, for a pure lift calculation, the net distributed pressure is the only necessary quantity. Thus, in order to determine a net lift on the foil, the signals from the top elements 51, 52, 53 are added together, while the signals from the lower surface elements 61, 62, 63 are subtracted, yielding a net lift on that portion of the wing. In practice, it may be useful to calibrate the system, for example in a wind tunnel environment, or by applying other known distributed forces on the sensors, so that the dimensionless force measurements supplied by the sub-elements can be translated into actual quantities. In a similar manner, drag can be determined by adding the signals from the upper and lower front elements 55, 65 of the drag sensor and subtracting the signals from the upper and lower rear elements. 56, 66.

As shown in FIGS. 5a-d, the airfoil 70 includes an upper point at approximately x/c=0.35 and a lower point at approximately x/c=0.2 where the angle of a line tangent to the surface of the airfoil crosses through zero as described above. As a result, the corresponding upper and lower sensors are split into chord-wise segments at those points along the x/c axis. As further shown in the FIGS. 5a-d, the sensor segments 51, 53, 55, 56, 61, 63, 65 and 66 have curved boundaries. The curvatures of the segment boundaries are determined by the geometry of the airfoil and in particular may be selected to provide a spatial weighting to the output of the sensor segments.

Figure 7B:
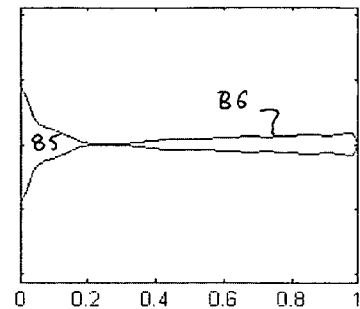
Figure 7C:
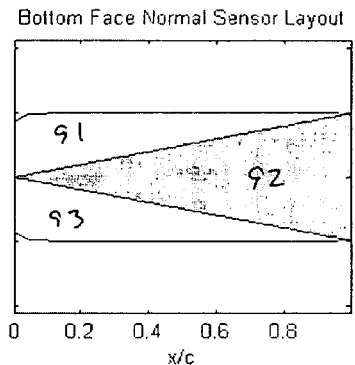
Figure 7D:
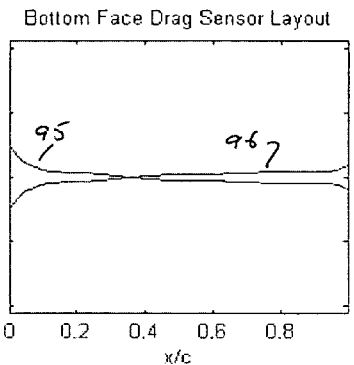
Figure 8:
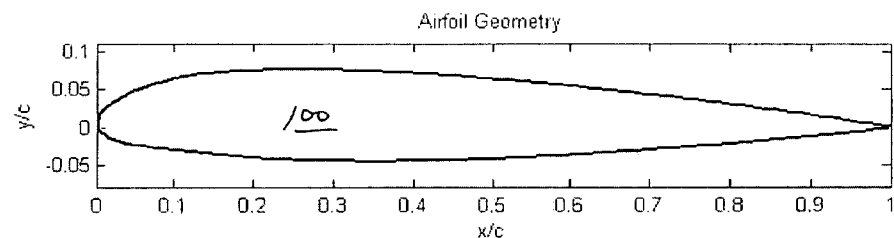
FIG. 8 is a schematic diagram showing another example of an airfoil geometry with dimensionless units.

In FIGS. 7a-d and 8, an airfoil 100 having a slightly different geometry from the airfoil 70 is illustrated, along with its respective sensor layouts. The lift sensors comprise upper segments 81, 82, 83 and lower segments 91, 92, 93 while the drag sensors comprise front segments 85, 95 and rear segments 86, 96. Operation is similar to that described with respect to FIGS. 5a-d and 6. The airfoil 100 includes an upper point at approximately x/c=0.25 and a lower point at approximately x/c=0.37 where the angle of a line tangent to the surface of the airfoil crosses through zero as described above. As a result, the corresponding upper and lower sensors are split into chord-wise segments at those points along the x/c axis. As with the sensors of FIGS. 5a-d, the curvatures of the segment boundaries may be determined in accordance with a desired spatial weighting and the geometry of the airfoil 100.

The lift and drag information provided by the sensors may be applied in a variety of systems. For example, the information may be supplied to a pilot in the form of a data stream, an alarm signal (e.g., when lift falls below a predetermined level), or to an automated aircraft control system. Where the information is supplied to an automated aircraft control system, the information may be used to adjust control surfaces, throttle, angle of attack, or other flight parameters.

The foregoing presentation of the described embodiments is provided to enable any person skilled in the art to make or use the present invention. Various modifications to these embodiments are possible, and the generic principles presented herein may be applied to other embodiments as well. For example, though the primary examples involve airfoils and aerodynamic measurements, embodiments of the invention may find application in hydrofoils, lifting bodies and other surfaces that interact dynamically with a fluid medium, including gaseous media. In this regard, the term "foil" is used herein to indicate both airfoils and hydrofoils. As another example, embodiments of the invention need not be limited to aperture segments having tapered geometries. A series of rectangular apertures arrayed along the x-axis and gain-weighted (for example, in proportion to x) can provide the same information that a taper does, and such geometries should be considered to be within the scope of the present invention. Thus, the present invention is not intended to be limited to the embodiments shown above but rather is to be accorded the widest scope consistent with the principles and novel features disclosed in any fashion herein.

What is claimed is:

1. A sensor comprising:
    a pressure sensitive element configured and arranged to, when in use, sense a distributed fluid pressure and produce a signal in response, the pressure sensitive element further being configured to be mountable on a foil along a chord-line of the foil,
    the pressure sensitive element further having a geometry split into chord-wise segments at a portion of a surface of the foil where an angle $\theta$ passes through zero, wherein $\theta$ is an angle of a tangent to the surface measured in a positive counterclockwise direction from the chord-line, such that the signals produced by each of the chord-wise segments may be processed together to obtain an axial component of the sensed distributed pressure.

2. A sensor as in claim 1, wherein the chord-wise segments comprise an upper-front segment and upper-rear segment mountable on an upper surface of the foil and a lower-front segment and a lower-rear segment mountable on a lower surface of the foil.

3. A sensor as in claim 2, further comprising a processor configured and arranged to receive the signals produced by the segments of the pressure sensitive element and to add a signal from the upper-front segment to a signal from the lower-front segment and to subtract a signal from the upper-rear segment and the lower-rear segment to determine a net axial pressure on the foil.

4. A sensor as in claim 3, further comprising a memory having stored therein machine readable calibration information, and wherein the net axial pressure on the foil is further processed using the calibration information to determine a drag on the foil.

5. A sensor as in claim 1, further comprising a lift sensor, the lift sensor comprising a pressure sensitive element configured and arranged to, when in use, sense the distributed fluid pressure and produce a signal in response such that the signal produced may be processed to obtain a normal component of the sensed distributed pressure.

6. A sensor as in claim 1, wherein the foil comprises an airfoil and the fluid pressure comprises an air pressure.

7. A sensor as in claim 1, wherein the foil comprises a hydrofoil and the fluid pressure comprises a hydraulic pressure.

8. A sensor as in claim 1, wherein the pressure sensitive element comprises a piezoresistive element, and the sensor further comprises a source, configured and arranged to produce a base signal and wherein the signal produced by the piezoresistive element comprises the base signal modulated by a transfer function of the piezoresistive element.

9. A sensor as in claim 1, wherein the pressure sensitive element comprises a piezoelectric element.

10. A sensor as in claim 1, wherein the pressure sensitive element further has a spatially weighted geometry dependent on a geometry of the chord-line of the foil.

11. A sensor as in claim 5, wherein the lift sensor is further divided into a plurality of spatially weighted sub-elements and wherein signals from each of the sub-elements can be processed together to determine at least one parameter of the distributed fluid pressure.

12. A sensor as in claim 11, wherein the at least one parameter comprises a center of pressure.

13. A method of measuring drag on a foil comprising:
    measuring a distributed fluid pressure on respective upper and lower front surface portions of the foil;
    measuring a distributed fluid pressure on respective upper and lower rear surface portions of the foil; and
    subtracting the measured distributed fluid pressure on the rear surface portions from the measured distributed fluid pressure on the front surface portions to obtain a net axial pressure.

14. A method as in claim 13 wherein the foil comprises an airfoil and the fluid pressure is comprises an air pressure.

15. A method as in claim 13 wherein the foil comprises a hydrofoil and the fluid pressure comprises a hydraulic pressure.

16. A method as in claim 13, wherein the measuring comprises using segmented pressure sensitive material, each segment of the segmented pressure sensitive material having a geometry dependent on a geometry of the foil.

17. A method as in claim 16, wherein the geometry comprises a spatial aperture weighted geometry.

18. A method as in claim 13, further comprising:
    calculating, from the net axial pressure and predetermined calibration coefficients, a drag force acting on the foil.

19. A method as in claim 13, further comprising measuring lift on the foil by:
    measuring an upward pressure on a lower surface portion of the foil;
    measuring a downward pressure on an upper surface portion of the foil; and
    subtracting the downward pressure from the upward pressure to determine a net normal pressure on the foil.

20. A method as in claim 17, further comprising:

calculating, from the net axial pressure and predetermined calibration coefficients, a drag force acting on the foil; and calculating, from the net normal pressure and predetermined calibration coefficients, a lift force acting on the foil.

21. A method of designing a pressure sensor mountable on a foil comprising:

determining at least one point at which an angle $\theta$ passes through zero, wherein $\theta$ is an angle of a tangent to a surface of the foil measured in a positive counterclockwise direction from a chord-line of the foil along which the sensor is to be disposed; and splitting the sensor into chord-wise segments at the at least one point.

\* \* \* \* \*